United States Patent
Ohno et al.

[11] Patent Number: 5,768,277
[45] Date of Patent: Jun. 16, 1998

[54] AUTOMATIC ID ASSIGNING DEVICE FOR NETWORK INSTRUMENTS

[75] Inventors: Masami Ohno; Osamu Iijima; Yasuhiko Mizoguchi; Akira Matsuzaki; Junko Nakano, all of Kadoma, Japan

[73] Assignee: Matsushita Electric Works, Ltd., Osaka, Japan

[21] Appl. No.: 497,158

[22] Filed: Jun. 30, 1995

[30] Foreign Application Priority Data

Jul. 25, 1994 [JP] Japan ................. 6-172633

[51] Int. Cl.$^6$ ................................. H04Q 3/00
[52] U.S. Cl. ................. 370/457; 370/475; 340/825.52
[58] Field of Search .............. 340/825.07, 825.08, 340/825.52; 370/254, 449, 457, 475

[56] References Cited

U.S. PATENT DOCUMENTS

| | | | |
|---|---|---|---|
| 4,849,752 | 7/1989 | Bryant | 340/825.52 |
| 4,949,337 | 8/1990 | Aggers et al. | 370/457 |
| 5,373,288 | 12/1994 | Blahut | 340/825.08 |
| 5,377,187 | 12/1994 | Spiotta et al. | 370/457 |

Primary Examiner—Benedict V. Safourek
Attorney, Agent, or Firm—Leydig, Voit & Mayer, Ltd.

[57] ABSTRACT

An automatic ID assigning device for LAN instruments connected in a network assigns ID numbers from a master LAN instrument to respective slave LAN instruments connecting sequentially to the master LAN instrument. A first slave LAN instrument stores, as its own self ID, an ID number supplied in an ID assignment command signal supplied from the master LAN instruments through a data line connecting ports of respective slave LAN instruments. The slave LAN instrument returns an ID assignment acknowledging signal to the master LAN instrument and connects upper and lower ports of the slave LAN instrument together. The master LAN instrument updates a connecting number table of the ports of the slave IDs upon receipt of the assignment acknowledging signals and transmits a subsequent ID assigning command signal to another slave LAN instrument through the data line and through the connected ports of slave LAN instruments to which ID numbers have already been assigned. The upper and lower ports, i.e., the input and output administrative data lines, of the slave LAN instruments to which ID numbers have not yet been assigned are not connected to each other.

13 Claims, 10 Drawing Sheets

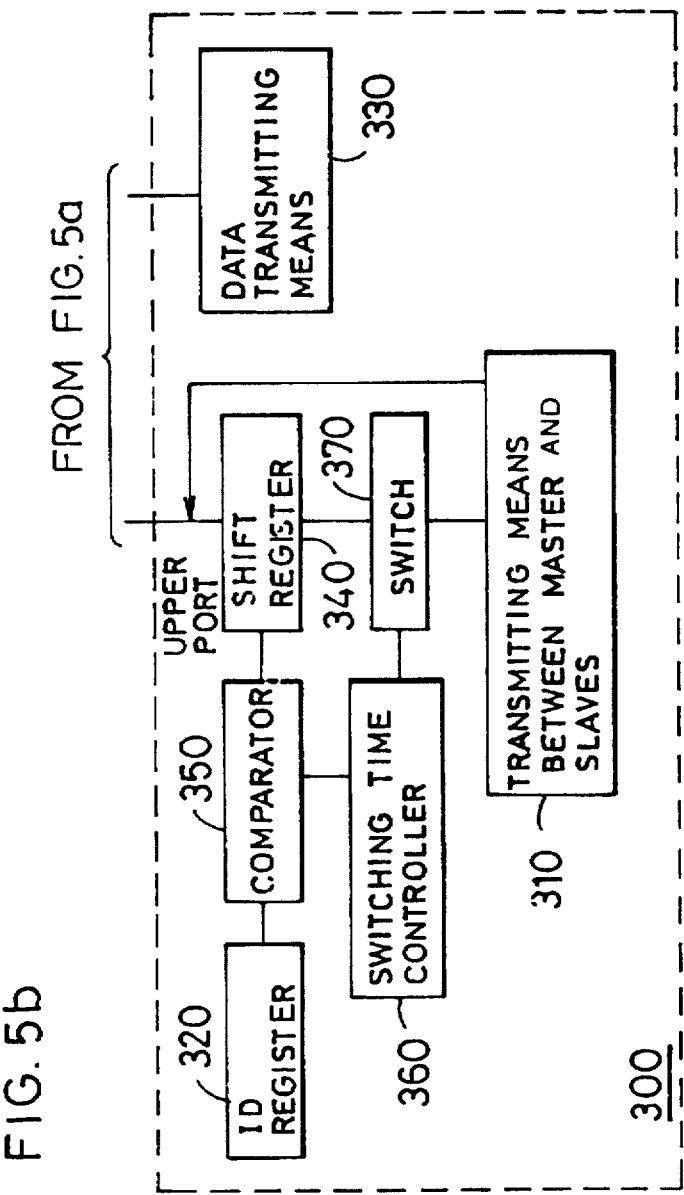
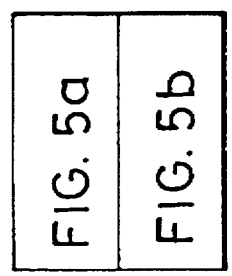
FIG. 5b
FIG. 5

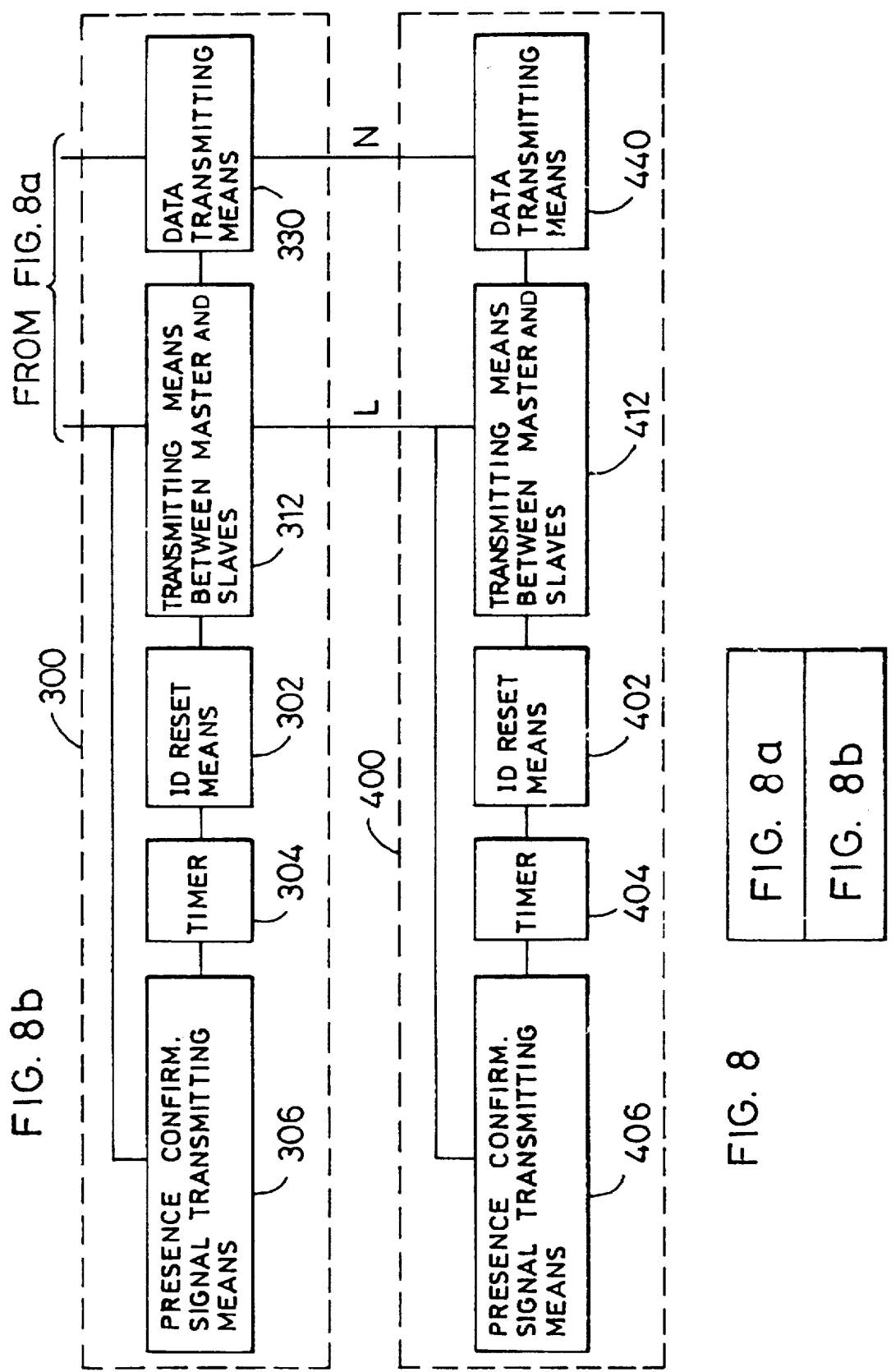

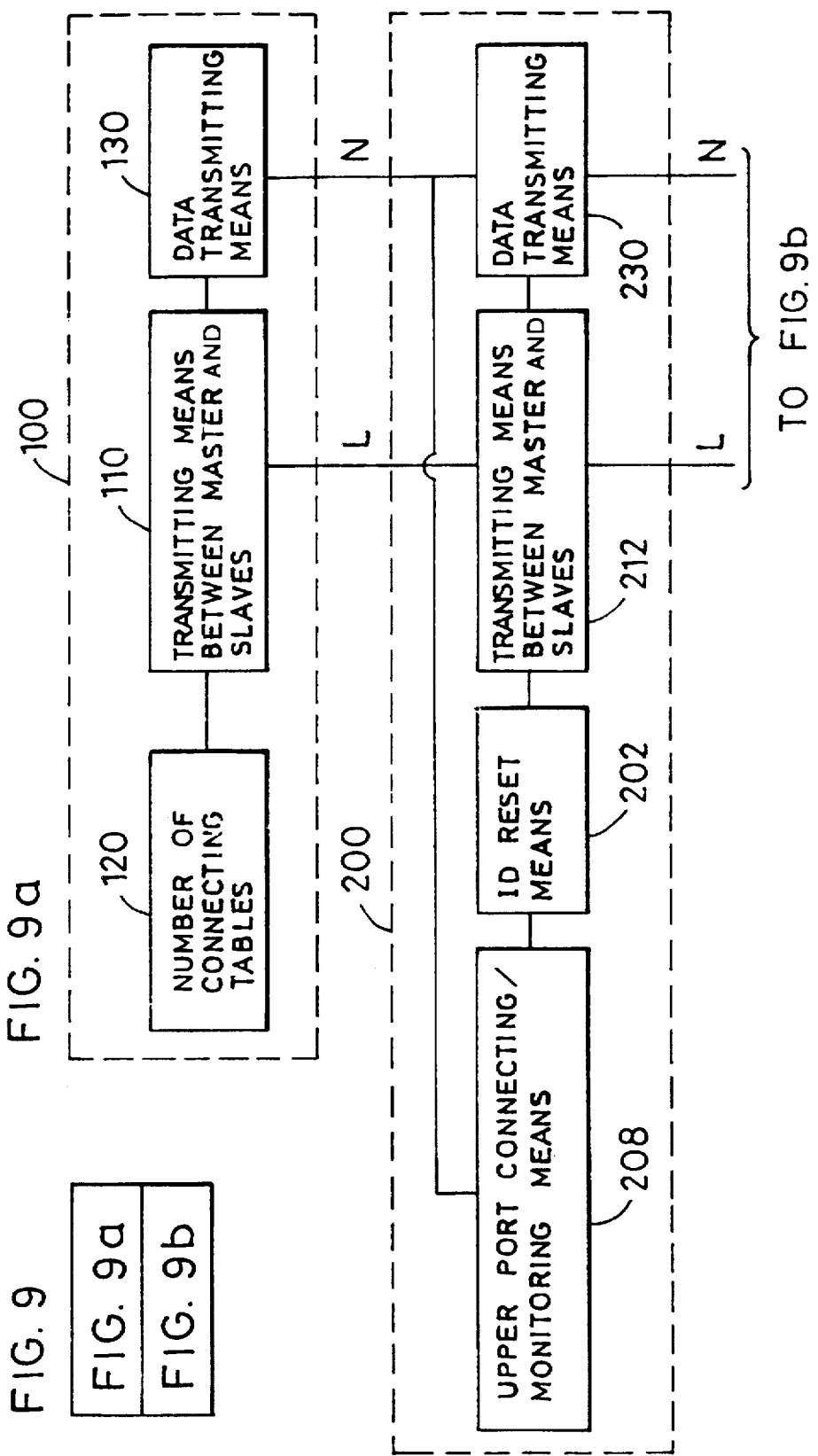

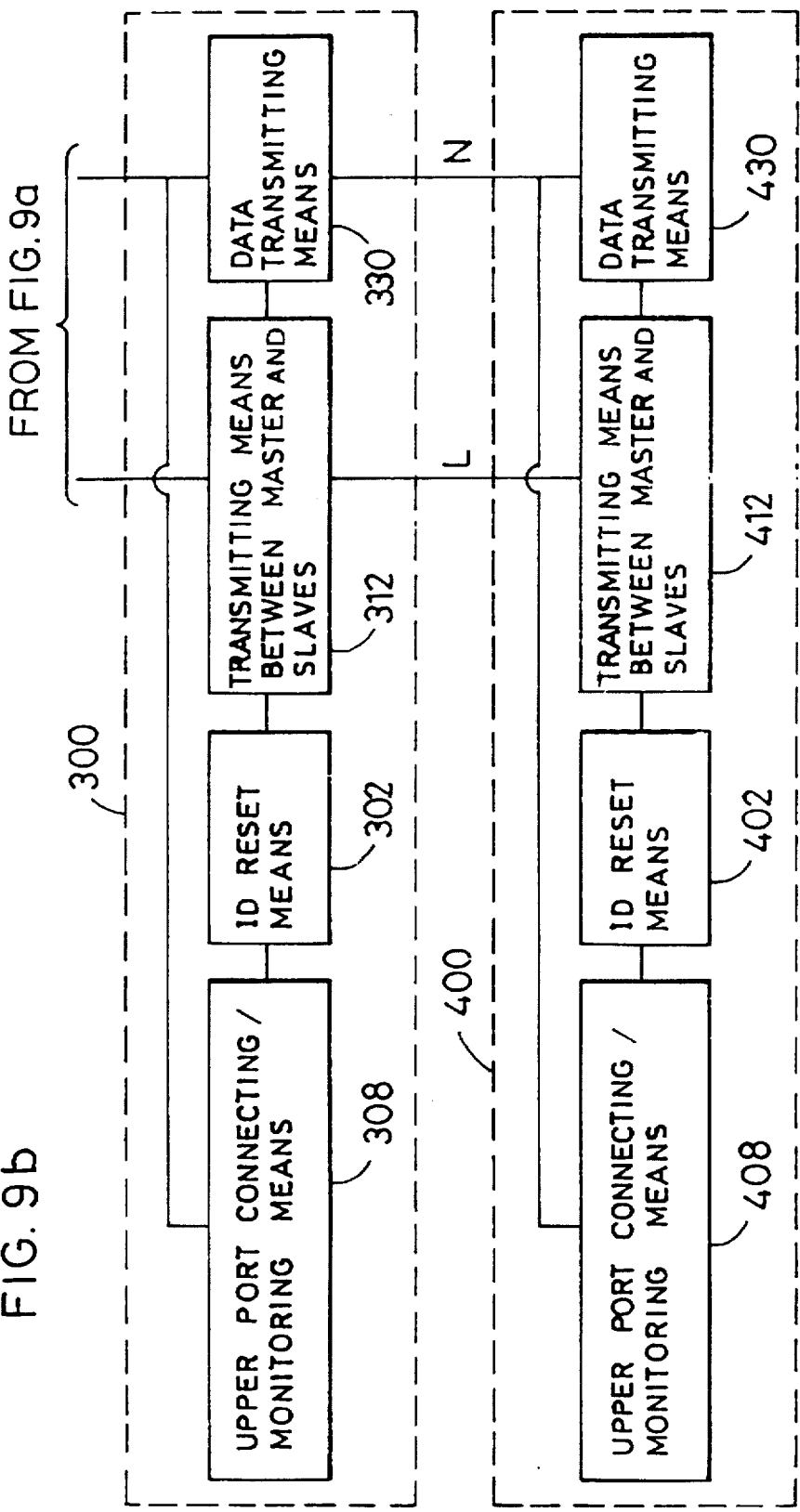

AUTOMATIC ID ASSIGNING DEVICE FOR NETWORK INSTRUMENTS

BACKGROUND OF THE INVENTION

This invention relates to a device for automatically assigning respective identification numbers to each of a plurality of instruments constituting a network.

DESCRIPTION OF RELATED ART

In assigning the identification number (which shall be hereinafter referred to simply as "ID") to respective LAN instruments in the network for their mutual communication, conventionally, a dip switch or the like has been mechanically set for every instrument, one by one. However, this measure has been troublesome because respective users are required to set each ID with respect to every one of the instruments so that there arises a risk that the same ID is set for two or more instruments due to complicated management of. Further, the connection arrangement of the LAN instruments on the network cannot be acknowledged because the ID assignment is performed irrespective of the connection arrangement of the instruments. Further, there has been an automatic, systematic ID assigning system employing an RS485 communication system, in which a request of a slave instrument for an ID causes a master instrument to automatically issue the ID and assign it to the particular slave instrument. Overlapping requests for ID from a plurality of the slave instruments render retransmission signals to be adjusted by means of random numbers or the like so that the master instrument will automatically assign different ID's to each of the slave instruments. While the ID's are thus automatically assigned in the instant system, the RS485 communication system employed is of the type including a bus, and there still remains the problem that the connection of the respective instruments can not be recognized in executing the ID assignment.

For the ID assigning arrangement of the kind referred to, reference may be made, for example, to U.S. Pat. No. 4,849,752 to Bryant.

SUMMARY OF THE INVENTION

The present invention has been suggested in order to eliminate the foregoing problem, and its primary object is to provide an automatic ID assigning device for network instruments which allows the connecting arrangement of the LAN instruments on a network employed to be recognizable. Another object is to eliminate any transmission of unnecessary management data.

Still another object is to provide the device which assigns ID's to the respective LAN instruments in accordance with a detected change in the connection arrangement, so as to quickly recognize accurate arrangement of the LAN instruments.

According to the present invention, the above objects can be achieved by means of an automatic ID assigning device for network instruments in a LAN system for managing the whole system through exchanges of management information between respective master and slave LAN instruments in the system, in which the master LAN instrument is provided with a connecting number table provided for transmitting ID assigning signals from the master LAN instrument to the slave LAN instruments through an management data line provided separately from network-use data lines, and for managing the respective slave LAN instruments connected to every port of the master LAN instrument, and with a communicating means for assigning the respective ID numbers to each of the slave LAN instruments connected, and the slave LAN instruments are respectively provided for being connected in a plurality to each port of the master LAN instrument, while each of the slave LAN instruments is provided with an upper LAN instrument connecting port connectable with the management data line and with an under LAN instrument connecting port connectable with under LAN instrument management data line, each slave LAN instrument further including a control means for connecting and disconnecting the upper LAN instrument connecting port and under LAN instrument connecting port so that the management data line of the upper and under LAN instrument ports will be disconnected by the slave LAN instrument in a state of not ID-assigned yet, and ID numbers for identifying the respective slave LAN instruments will be transmitted as ID assigning command signals to the management data line, making references to the connecting number table for every port by the master LAN instrument; wherein the slave LAN instruments respectively receive the ID assigning command signals and store thus received ID number as their own ID while transmitting an own ID assignment acknowledging signal through the upper LAN instrument connecting port to the master LAN instrument, the management data line of the upper and under LAN instrument connecting ports being thereby made in connected state, and the master LAN instrument which has received the own ID assignment acknowledging signal from any slave LAN instrument renews the connecting number table of the port of this instrument and transmits to the management data line the further ID assigning command signal containing another ID number of identifying another slave LAN instrument, which operation being repeated to automatically assign the ID numbers to the respective slave LAN instruments.

Other objects and advantages of the present invention shall be made clear in following description of the invention detailed with reference to preferred embodiments shown in accompanying drawings.

BRIEF DESCRIPTION OF THE DRAWINGS

FIGS. 5a and 5b show in a block diagram another embodiment of the master and slave LAN instruments according to the present invention;

FIGS. 8a and 8b show in a block diagram arrangements of respective LAN instruments in another embodiment according to the present invention; and FIGS. 9a and 9b show in a block diagram arrangements of respective LAN instruments in still another embodiment according to the present invention.

While the present invention shall now be described with reference to the respective preferred embodiments shown in the accompanying drawings, it should be appreciated that the intention is not to limit the invention only to the embodiments shown but rather to include all alterations, modifications and equivalent arrangements possible within the scope of appended claims.

DETAILED DESCRIPTION OF THE PREFERRED EMBODIMENTS

Figure 1:
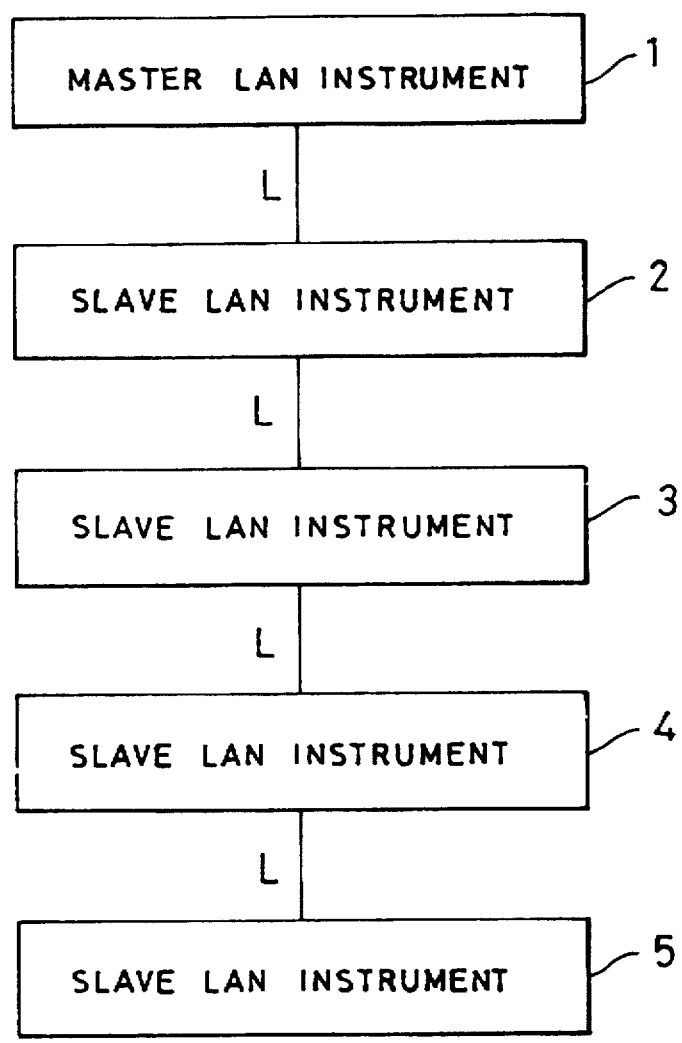
FIG. 1 is a diagram showing schematically the arrangement of a network to which the present invention is applicable.

Referring to FIG. 1, there is shown an arrangement of a LAN (local area network) in an automatic ID assigning device according to the present invention. More specifically, the device according to the present invention comprises a master LAN instrument 1 and a plurality, four in the present instance, of slave LAN instruments 2–5 which are connected respectively in series to a port of the master LAN instrument 1 through data lines L for exclusive management use.

Figure 2:
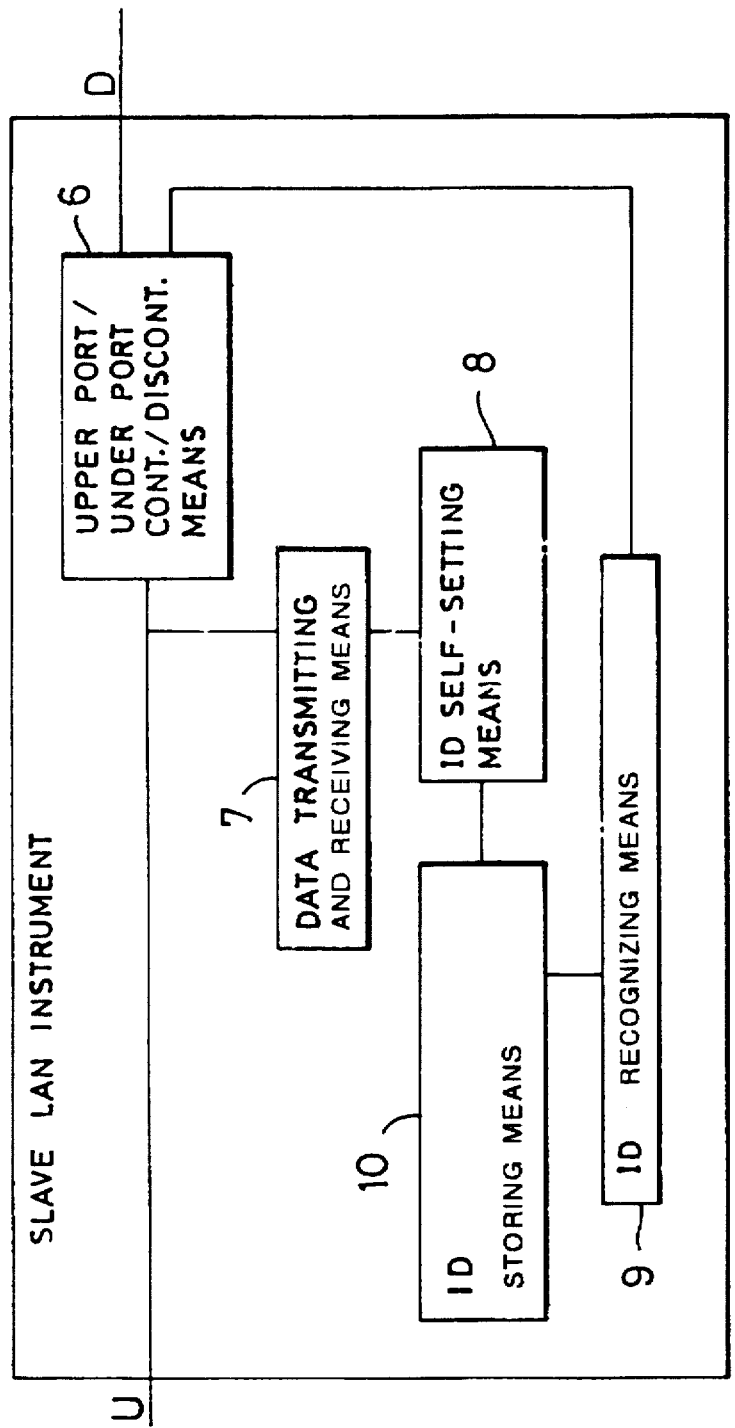
FIG. 2 is a block diagram showing an example of arrangement of a slave LAN instrument in an embodiment according to the present invention.

Referring to FIG. 2, further, there is shown a practical arrangement of the slave LAN instruments. In the present instance, the slave LAN instrument has an upper LAN instrument connecting port (which shall be hereinafter referred to as an "upper port") U and an under LAN instrument connecting port (which shall be hereinafter referred to as an "under port") D, and comprises an upper or under port connecting or disconnecting means 6, a data transmitting and receiving means 7, an ID self-setting means 8, an ID recognizing means 9 and an own ID storing means 10. The upper or under port connecting or disconnecting means 6 controls connecting and disconnecting the upper port U or the under port D. The data transmitting and receiving means 7 receives data from the upper port U and also transmits data to the upper port U. The ID self-setting means 8 is to set, when the slave LAN instrument has not yet been assigned an ID, an ID given by an ID setting command from the master LAN instrument in the ID storing means 10. The ID recognizing means 9 recognizes the not set state and the set state of the ID, controls the upper or under port connecting or disconnecting means 6, depending on the recognized state and, if in the own ID unset state, the upper and under ports are in the disconnected state but, if in the own ID set state, these ports are in the connected state.

Figures 3, 4A, 4B:
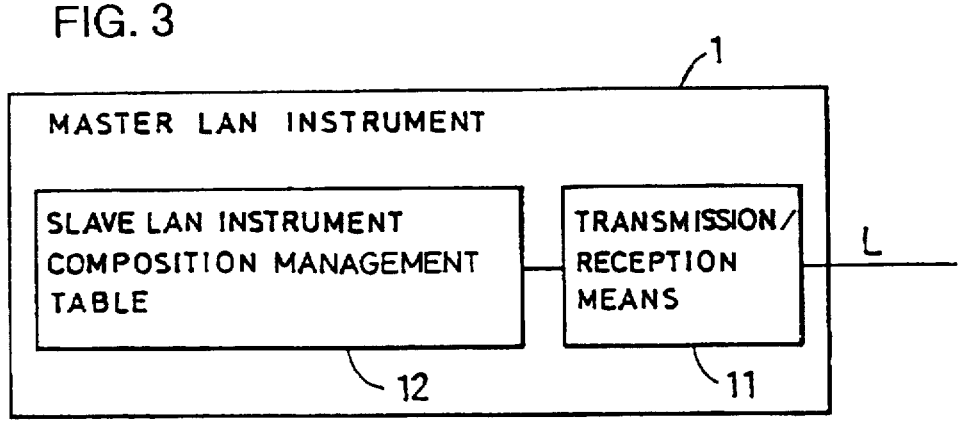
FIG. 3 is a block diagram showing a working aspect of the master LAN instrument used in association with the slave LAN instrument in the embodiment of FIG. 2.
FIGS. 4(a) and 4(b) are explanatory views for a working aspect of a management data packet for use with the instrument in the embodiment of FIG. 2.

FIG. 3 shows an arrangement of the master LAN instrument 1, which comprises a transmission/reception means 11 with respect to the slave LAN instruments, and a management table 12 for the slave LAN instrument composition. In a state where the composition of the slave LAN instrument could have been recognized, the slave LAN instrument is subjected to polling, and the information on the state of the slave LAN instruments is collected. In a state where the composition of the slave LAN instrument can not be recognized, a composition recognizing packet is transmitted so that the composition can be recognized. The composition state of the slave LAN instruments is managed by means of the slave LAN instrument composition management table 12.

TABLE

| Composition No. | Registered ID | Slave LAN Instrument Information |
|---|---|---|
| 1 | 1 | Port 1: ENABLE; Port 2: DISABLE; . . . |
| 2 | 2 | Port 1: DISABLE; Port 2: ENABLE; . . . |
| 3 | 0 | Port 1: ENABLE; Port 2: ENABLE; . . . |
| 4 | 0 | Port 1: ENABLE; Port 2: ENABLE; . . . |

In the above Table, there is shown the slave LAN instrument composition management table. In a system where up to four of the slave LAN instruments can be connected to one port of the master LAN instrument, the table allowing the information of up to four instruments is provided to every port. The ID numbers are set with respect to the slave LAN instruments, the connection of which appears in the tables of Composition Nos. 1–4. In the initial state, the slave LAN instruments are not recognized, and Registration ID is zero for all. As the information of the slave LAN instruments, an ENABLE or a DISABLE state or partition state at the ports of the slave LAN instruments, for example, is collected.

In FIG. 4, there are shown packets for the master LAN instrument to recognize the composition of the slave LAN instruments, in which (a) is an ID assigning command packet transmitted from the master LAN instrument to the slave LAN instruments, and (b) is an ID assignment acknowledging packet with respect to the command packet for carrying out the transmission from the slave LAN instrument to the master LAN instrument. Here, the master LAN instrument appoints the assigning ID numbers to transmit the ID assigning command, and the slave LAN instrument of which ID is set by this command, transmits back the ID assignment acknowledging packet to the master LAN instrument.

Further, the operation of the automatic ID assigning device according to the present invention shall be described in the followings. It is assumed here that, as in FIG. 1, four of the slave LAN instruments are connected to the master LAN instrument, and, in the initial state, the master LAN instrument still has not recognized any one of the slave LAN instruments. In this state, nothing is registered in the management table of the slave LAN instrument's composition, and Registered ID is all zero with respect to Composition Nos. 1–4. On the other hand, the respective slave LAN instruments are all in the state where an ID has not been set yet, so that the ID recognizing means 9 in the respective slave LAN instrument recognizes this, the upper or under port connecting or disconnecting means 6 is controlled, and the upper and under ports are placed in open state. In this state, there flows no data from the upper port to the under port, whereby the packet transmitted from the master LAN instrument is received by the first slave LAN instrument 2 but does not reach the following slave LAN instruments 3–5.

In the master LAN instrument, first, the smallest value ID=1 is to be set and, for this purpose, ID=1 is set to the ID assigning command shown in FIG. 4(a) and is transmitted. The slave LAN instrument 2 receives this assigning command, the self ID is set to be 1, and the ID assignment acknowledging packet as shown in FIG. 4(b) is transmitted to the master LAN instrument. Further, the ID recognizing means 9 recognizes that its own ID is set to be 1, and the upper or under port connecting or disconnecting means 6 is controlled to have the upper and under ports connected. Since, at this time, the slave LAN instruments 3–5 have not yet received the ID assigning command from the master LAN instrument 1, they are maintained in the not yet ID-set state. Upon receipt of the ID assignment acknowledging packet from the slave LAN instrument 2, the master LAN instrument 1 registers the contents of the packet in the management table 11 of the slave LAN instrument composition.

Next, in order to set ID=2, the master LAN instrument 1 sets this ID=2 to the ID assigning command and transmits this command. While this command is received also by the slave LAN instrument 2, the command is ignored since the slave LAN instrument 2 is already in the self ID set state. Since the slave LAN instrument 2 is in the state where the upper and under ports are mutually connected, the received command reaches the next slave LAN instrument 3. Because this slave LAN instrument 3 is in the not yet ID-set state, the received command causes the self ID to be set to "2" for the instrument and the slave ID assignment acknowledging packet to be transmitted to the master LAN instrument 1. Upon receipt of this packet, the master LAN instrument 1 registers Reg. ID=2 at Composition No. 2 of the management table of the slave LAN instrument composition. At this moment, other slave LAN instruments 4 and 5 are in the not yet ID-assigned state.

In the same manner, the master LAN instrument 1 transmits the ID assigning commands of ID=3 and ID=4, and Reg. ID=3 and ID=4 are set sequentially for the slave LAN instruments from the one closer to the master LAN instrument. Further, these ID's are registered at the management table of the slave LAN instrument composition.

With the above operation, the master LAN instrument recognizes the composition of the slave LAN instruments connected to its port, and is thus capable of managing them. It should be appreciated that, as the composition recognition of the slave LAN instruments is completed, the master LAN instrument enters into polling for collection of data from the slave LAN instruments so that the state and information of the connected slave LAN instruments can be constantly supervised.

Figure 5A:
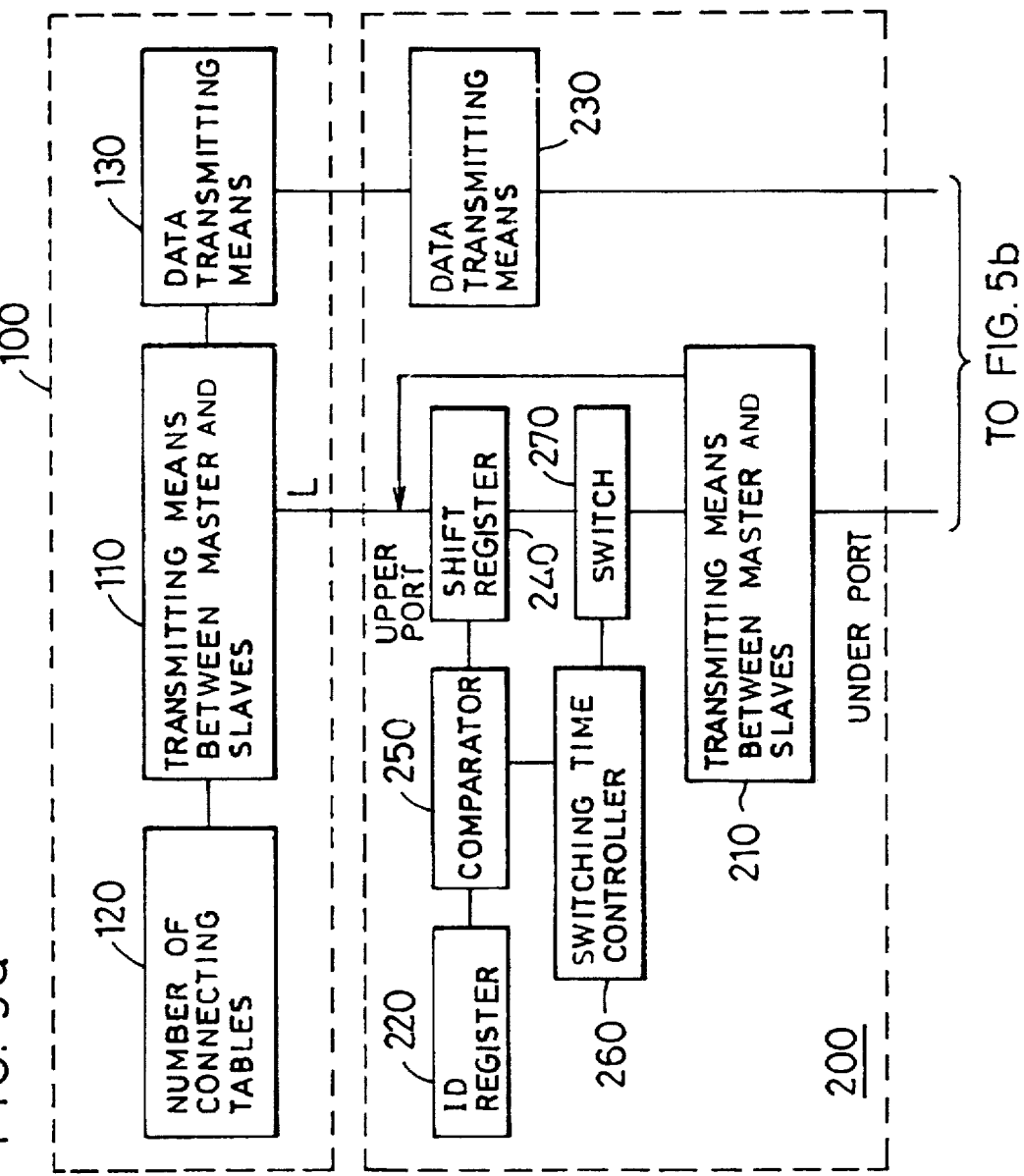

Referring to the block diagram of FIGS. 5a and 5b showing another embodiment of the present invention, there is prepared at the master LAN instrument 100, in this embodiment, a packet in which a number with "1" added to the largest of the ID's of the slave LAN instruments connected at this moment, to be an addressee ID. This packet is sent periodically to all ports of the slave LAN instrument 200 through the management data line L as an ID recognition request. This slave LAN instrument 200 has a shift register 240 for receiving signals coming from the upper port, and the packet received is subjected to buffering. In a state where the ID is not recognized yet, an initial self ID is set to a number larger than the largest number of the slave LAN instruments 200, 300, . . . connectable to the master LAN instrument 100. This larger number is preserved in an ID register 220. At a comparator 250, the preserved ID in the ID register 220 is compared with the addressee ID contained in the packet held by the shift register. Here, when the addressee ID is smaller than the self ID, the latter is changed to the addressee ID, the packet is not sent to the under port, and the master LAN instrument 100 is contacted to report through the management line L that the self ID has been recognized. When the self ID and addressee ID are identical to each other, the packet is processed as one for the self instrument and is not sent to the under port. When the addressee ID is larger than the self ID, a switch 270 is controlled by a switching time controller 260 for a period adapted to the composition of the packet, and this packet is sent to the under port.

Figure 6:
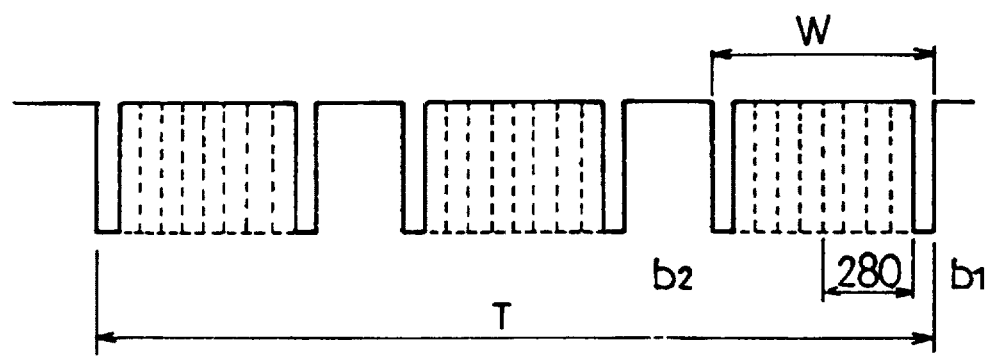
FIG. 6 is an explanatory view for a working aspect of the management data packet for use in the embodiment of FIG. 5.
Figure 7:
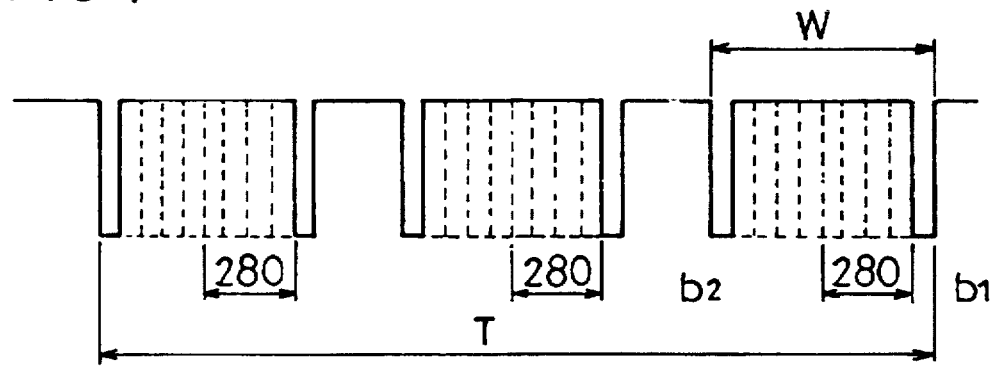
FIG. 7 is an explanatory view for another working aspect of the management data packet in the embodiment of FIG. 5.

In FIGS. 6 and 7, there are shown arrangements of the packets taken into the shift register 240 of the slave LAN instrument 200. In a working aspect of FIG. 6, a fixed word W having a fixed packet length T includes an addressee ID 280 at several initial bits, and the packet is transmitted to the slave LAN instrument 300 of the under port of the slave LAN instrument 200, by controlling the switch 270 for a switching time adapted to the fixed packet length T. Synchronization of a word unit is performed at a start bit b1 and a stop bit b2. In another working aspect of FIG. 7, every word includes the addressee ID 280, so that the switching time of the switch 270 is controlled at every word W.

The foregoing master LAN instrument can transmit a broadcast signal (general simultaneous transmission signal) which can be received by all slave LAN instruments connected to the ports of the master LAN instrument. At this time, the master LAN instrument transmits an ID reset command for the slave LAN instruments with the broadcast signal upon source re-making and reset operation after source breaking. Any slave LAN instrument which has received this command is reset by an ID reset means and is caused to shift to the not ID-set state. Thereafter, the master LAN instrument starts the ID assignment to the slave LAN instruments from the initial state and newly registers the connection arrangement.

Figure 8A:
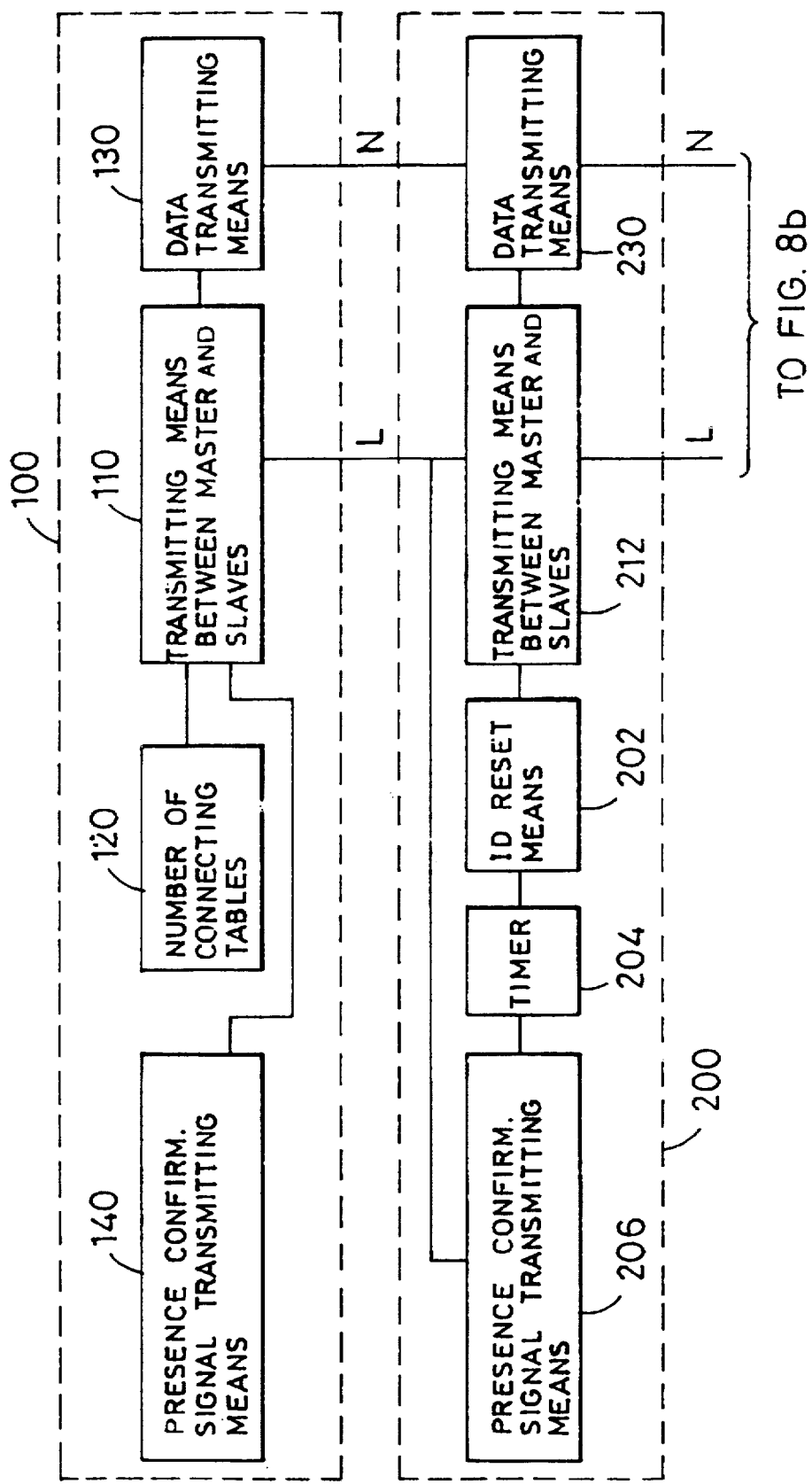

Referring next to a block diagram of FIG. 8 showing still another embodiment of the present invention, the master LAN instrument 100 in this embodiment is provided with a presence confirmation signal transmitting means 140, which periodically transmits a presence confirmation signal to the management data line L. The slave LAN instrument 200 includes a presence confirmation signal detecting means 206 at the upper port connected to the management data line L and recognizes the presence confirmation signal sent periodically from the master LAN instrument 100. When a timer 204 determines that the presence confirmation signal has not been received for a set term, an ID in a transmitting means 212 between the master LAN instrument and the slave LAN instruments is reset by an ID reset means 202, and this slave LAN instrument 200 shifts to the no ID-recognition state. This operation can be similarly performed in other slave LAN instruments 300 and 400.

Referring to a block diagram of FIG. 9 showing a still further embodiment of the present invention, the slave LAN instrument 200 in this embodiment is provided with an upper port connection monitoring means 208 connected to an ordinary network data line N separate from the management data line L. In this case, whether the data line is connected is monitored so that, when a disconnection of the upper port data line is detected, the ID at the between master-and-slaves transmitting means 212 is reset by the ID reset means 202, and the slave LAN instrument 200 shifts to the no ID-recognition state. This operation can also be performed similarly in the further slave LAN instruments 300 and 400.

What is claimed is:

1. An automatic ID assigning device for network instruments in a LAN system for managing a network system through exchanges of management information between respective network instruments in the LAN system, the device comprising:

a master LAN instrument, including a connecting number table having a management data line and a separate packet-passing data line, for transmitting management data and managing respective LAN instruments connected to every port of the master LAN instrument, and communication means for assigning respective ID numbers to each of slave LAN instruments connected to the master LAN instrument; and a plurality of slave LAN instruments respectively connected to the master LAN instrument, each of the slave LAN instruments including an upper LAN connecting port connectable with the management data line and an under LAN connecting port connectable with the management data line, control means for connecting and disconnecting the upper LAN connecting port to and from the under LAN connecting port, and means for disconnecting the management data line of the upper and under LAN instrument ports when an ID has not yet been assigned to the slave LAN instrument, and the master LAN instrument including means for transmitting ID numbers for identifying respective slave LAN instruments as ID assigning command signals on the management data line, making reference to the connecting number table for every port of the slave LAN instrument, wherein the slave LAN instruments respectively include means for receiving the ID assignment command signals and storing a received ID number as a self ID while transmitting a self ID assignment acknowledging signal through the upper LAN connecting port to the master LAN instrument, and connecting the management data line to the upper and under LAN connecting ports, and the master LAN instrument includes means for updating, when a self ID assignment acknowledging signal is received, the connecting number table, and transmitting to the management data line a further ID assigning command signal containing another ID number for identifying another slave LAN instrument, and repeating transmission of the ID assigning command signals to automatically assign ID numbers to respective slave LAN instruments.

2. The device according to claim 1, wherein the slave LAN instruments respectively comprise a register for storing the ID number, means for detecting an addressee ID contained in data from the management data line, means for comparing the ID number and the addressee ID with each other to produce a comparison result, means for controlling connection and disconnection of the upper LAN connecting port to and from the under LAN connecting port in response to the comparison result, means for storing the data from the management data line until an ID is detected, means for sequentially transmitting the data stored after detection of an ID, means for setting in the means for storing a larger ID than a maximum number of slave LAN instruments connectable to the master LAN instrument as an initial value before assignment of an ID number, and means for detecting the addressee ID upon receiving the data from the management data line, comparing an address ID with an ID number in the means for storing, preserving in the means for storing the ID number received as a self ID when the comparison result is small and transmitting the ID assignment acknowledging signal through the upper LAN connecting port to the master LAN instrument and, when the comparison result is large, transmitting the data from the management data line to the under LAN connecting port with the management data line of the upper LAN connecting port and the under LAN connecting port connected to each other, and the master LAN instrument comprises means for updating the connecting number table when the ID assignment acknowledging signal is received, means for transmitting the ID assigning command signal containing another ID number to the management data line, and means for assigning ID numbers to respective slave LAN instruments by repetition through the under LAN connecting port of the slave LAN instruments to which ID numbers have been already assigned.

3. The device according to claim 1, wherein the master LAN instrument further comprises communication means for transmitting a reset command for resetting ID numbers of the slave LAN instruments in accordance with a general simultaneous transmission command, and the slave LAN instruments respectively further comprise means for resetting the self ID number upon receiving a reset command, the means for resetting being activated upon resetting of the master LAN instrument.

4. The device according to claim 1, wherein the master LAN instrument further comprises means for transmitting a presence confirmation signal of the slave LAN instruments for confirming presence of the slave LAN instruments, periodically, at fixed time intervals, and the slave LAN instruments respectively further comprise timer means, and means for resetting their self ID numbers upon a timeout of the timer means without receipt of the presence confirmation signal.

5. The device according to claim 1, wherein the slave LAN instruments respectively further comprise an upper port connection monitoring means for monitoring connection of the packet-passing data line connected to the upper LAN connecting port, and means for resetting the self ID number upon detection by the monitoring means of disconnection of the packet-passing data line.

6. The device according to claim 2, wherein the master LAN instrument further comprises communication means for transmitting a reset command for resetting ID numbers of the slave LAN instruments in accordance with a general simultaneous transmission command, and the slave LAN instruments respectively further comprise means for resetting the self ID number upon receiving a reset command, the means for resetting being activated upon resetting of the master LAN instrument.

7. The device according to claim 2, wherein the master LAN instrument further comprises means for transmitting a presence confirmation signal of the slave LAN instruments for confirming presence of the slave LAN instruments, periodically, at fixed time intervals, and the slave LAN instruments respectively further comprise timer means, and means for resetting their self ID numbers upon a timeout of the timer means without receipt of the presence confirmation signal.

8. The device according to claim 2, wherein the slave LAN instruments respectively further comprise an upper port connection monitoring means for monitoring connection of the packet-passing data line connected to the upper LAN connecting port, and means for resetting the self ID number upon detection by the monitoring means of disconnection of the packet-passing data line.

9. An automatic ID assigning device for network instruments in a LAN system for administering the LAN system through exchanges of administrative data between respective network instruments in the LAN system, the device comprising:

a master LAN instrument having at least one port that includes a packet-passing data line and an administrative data line for communication of administrative data; and at least one slave LAN instrument connected to the master LAN instrument through the at least one port, the master LAN instrument including a connecting number table for administering the at least one slave LAN instrument connected to the at least one port, and communication means for assigning an ID number to the at least one slave LAN instrument, the slave LAN instrument including upper and lower LAN connecting ports including, respectively, a LAN data line and an administrative data line, control means for connecting and disconnecting the upper and lower LAN connecting ports to and from each other, and means for disconnecting the administrative data line from the upper and lower LAN connecting ports when an ID number has not yet been assigned to the at least one slave LAN instrument, the master LAN instrument including means for transmitting ID numbers for identifying respective slave LAN instruments as ID assigning command signals through the administrative data line by reference to the connecting number table, the at least one slave LAN instrument including means for receiving the ID assignment command signal, storing a received ID number as a self ID, transmitting a self ID assignment acknowledging signal through the upper LAN connecting port to the master LAN instrument, and connecting the administrative data line to the upper and lower LAN connecting ports, and the master LAN instrument including ID number assigning means for automatically assigning an ID number to the at least one slave LAN instrument by updating, upon receipt of the self ID assignment acknowledging signal from the at least one slave LAN instrument, the connecting number table with respect to the at least one port through which the self ID assignment acknowledging signal is received, and transmitting to the administrative data line another ID assigning command signal containing another ID number for identifying, when provided, another slave LAN instrument.

10. The device according to claim 9, including a plurality of slave LAN instruments connected sequentially to a single port of the master LAN instrument, wherein the slave instruments respectively comprise a register for storing their self ID number, means for detecting an addressee ID contained in data received through the administrative data line, means for comparing the addressee ID with the self ID number stored in the register to produce a comparison result, means for controlling connection and disconnection of the upper and lower LAN connecting ports to and from each other in response to the comparison result, means for storing data received from the administrative data line until an ID number is detected, means for sequentially transmitting the data stored in the means for storing upon detection of an ID number, means for setting in the register a number larger than the number of slave LAN instruments connectable to the master LAN instrument as an initial value, and means for detecting the addressee ID upon receiving administrative data, comparing a detected addressee ID with the addressee ID stored in the register, preserving in the register the ID number received as the self ID when the comparison result is small and transmitting the self ID acknowledging signal through the upper LAN connecting port to the master LAN instrument and, when the comparison result is large, transmitting the administrative data to the under LAN connecting port with the administrative data line of the upper LAN connecting port connected to the under LAN connecting port, and the ID number assigning means comprises means for updating, when the self ID assignment acknowledging signal is received from one of the slave LAN instruments, the connecting number table with respect to the port through which the self ID assignment acknowledging signal is received, means for transmitting another ID assigning command signal containing another ID number to the administrative data line, and means for repeating updating and transmitting to assign respective ID numbers to each of the respective slave LAN instruments, the ID number being transmitted through slave LAN instruments to which self ID numbers have already been assigned through the under LAN connecting ports of the slave LAN instruments to which ID numbers have already been assigned.

11. The device according to claim 10, wherein the master LAN instrument further comprises means for transmitting to respective slave LAN instruments a reset command for resetting the self ID numbers of each of the slave LAN instruments, and the slave LAN instruments respectively further comprise means for resetting the self ID numbers upon receiving the reset command, the means for resetting being activated upon resetting of the master LAN instrument.

12. The device according to claim 10, wherein the master LAN instrument includes a plurality of ports, the plurality of slave LAN instruments being connected to respective ports of the master LAN instrument, and the master LAN instrument further comprises means for transmitting periodically, at fixed time intervals, a presence confirmation signal to each of the ports and to all of the slave LAN instruments to confirm presence of the slave LAN instruments, and the slave LAN instruments respectively further comprise a timer for resetting the self ID number of each slave LAN instrument when the presence confirmation signal is not received during a time interval set by the timer.

13. The device according to claim 10, wherein the slave LAN instruments respectively further comprise an upper port connection monitoring means for monitoring connection of the packet-passing data line and means for resetting the self ID number upon detection by the monitoring means of disconnection of the packet-passing data line, indicating a change in connection arrangement in the LAN system.

* * * * *